United States Patent [19]
Douglas

[11] Patent Number: 5,812,977
[45] Date of Patent: Sep. 22, 1998

[54] VOICE CONTROL COMPUTER INTERFACE ENABLING IMPLEMENTATION OF COMMON SUBROUTINES

[75] Inventor: H. Russell Douglas, Sugar Land, Tex.

[73] Assignee: Applied Voice Recognition L.P., Houston, Tex.

[21] Appl. No.: 696,125

[22] Filed: Aug. 13, 1996

[51] Int. Cl.[6] .................................................. G10L 3/00
[52] U.S. Cl. ........................ 704/275; 704/270; 704/243
[58] Field of Search ................................. 704/275, 270, 704/243

[56] References Cited

U.S. PATENT DOCUMENTS

4,776,016  10/1988  Hansen ..................................... 704/275

*Primary Examiner*—David R. Hudspeth
*Assistant Examiner*—Robert Louis Sax
*Attorney, Agent, or Firm*—Gunn & Associates P.C.

[57] ABSTRACT

The present disclosure is directed to a computer assisted system which enables a computer user with less than fully developed computer skills to enable and implement a number of subroutines. The present disclosure is more particularly directed to a user not accustomed to operating a computer, and further not accustomed to operating a computer which presents a multitude of symbols on the screen which are used to open various subroutines. The disclosed system, which is preferably operated by means of voice commands, therefore improves the performance of the user so that the subroutines can be fetched more readily, operated more effectively to obtain the desired results or output, and then easily closed or terminated. The disclosed system is further simplifies computer start up operations.

25 Claims, 3 Drawing Sheets

FIG. 5

VOICE CONTROL COMPUTER INTERFACE ENABLING IMPLEMENTATION OF COMMON SUBROUTINES

BACKGROUND OF THE DISCLOSURE

The present disclosure is directed to a computer assisted system which enables a computer user with less than fully developed computer skills to enable and implement a number of subroutines. The present disclosure is more particularly directed to a user not accustomed to operating a computer, and further not accustomed to operating a computer which presents a multitude of symbols on the screen which are used to open various subroutines. The disclosed system therefore improves the performance of the user so that the subroutines can be fetched more readily, operated more effectively to obtain the desired results or output, and then easily closed or terminated.

A powerful tool in the hands of a skilled computer operator may provide performance in the handling of a larger number of tasks, but the tasks can become daunting when the tool is viewed simply as icons or folders displayed on a monitor screen. The computer monitor is provided with a cathode ray tube (CRT) or flat screen display which provides an image on a screen. The screen typically will assist the user in some fashion by providing what is known as a graphic user interface (GUI) which is typically located on the "desktop". The term "desktop" refers to the marginal edge of the monitor display which is viewed by the user. The GUI is manifest by a number of symbols or other installed components bordering the edge of the viewed screen. The user then performs some task in the central portion of the screen which is, for want of a better word, sometimes known as a "window." If, as an example, the user is executing a word processing package to thereby prepare a short note or even a very long document, the window encloses the written document, and is encircled by the GUI which is at the desktop. The GUI can be displayed at the vertical margins of the window, or at the top or bottom margins of the window, or in any combination thereof. A specific task, such as creating a window within which a document is written by means of a keyboard, is usually initiated by "clicking" the appropriate GUI symbol with a mouse. This well known approach, now established in the personal computer (PC) trade, is often very intimidating to the user with reduced computer skills. Such users usually have a hesitancy to reach up, move a cursor, direct the cursor to a particular code or icon on the screen at the GUI, and click on it either by use of function keys or a mouse. When that occurs, there is always that stark uncertainty by the unskilled user that the next window opening may be correctly selected, but it may also be wrongly selected. Because of this difficulty in the execution of the symbols or icons, there is an intimidation factor which makes the users truly sense that they are less than skilled, and breakthroughs in their personal competency are retarded by this intimidation. In most cases, this type of intimidation is not helped by hands-on assistance from a well trained person. In fact, such assistance may simply be even more intimidating, because the well trained person tends to move so quickly, execute tasks so readily, and make what is difficult to one person look so easy, that the unskilled users are readily discouraged. If keyboard selections are made, there is an uncertainty on whether or not the keyboard inputs are the appropriate ones for the GUI which responds to function keys. The definitions for the various functions seem a bit remote or arcane and are, therefore, less than helpful to an unskilled or amateurish computer operator.

Voice activated and voice controlled computer interfaces have been developed for a number of reasons. The primary reason for the emergence of such technology seems not to be simplification of computer operation for the unskilled user, but rather to free the computer user's hands for the performance of other manual task while simultaneously operating a computer. Known prior art systems are configured about various voice recognition systems which are, in general, expensive to construct and rigid in design. This is particularly true for ruggedized systems suitable for heavy manufacturing uses such as plant floor robotics and for military and avionics applications. Most of these systems are also configured around a voice recognition system designed to store a vocabulary of hundreds or even thousands of words.

U.S. Pat. No. 4,737,976 to David E. Borth et al discloses an improved hands-free user-interactive control and dialing system for use with a speech communication device. The system incorporates audio but no visual feedback to the user. Switchable input/output circuitry is taught but limited to radio logic and control synthesizer.

U.S. Pat. No. 5,027,406 to Jed Roberts et al teaches a method for creating word models for a large vocabulary, natural language dictation system. This system incorporates a node based concept, selective voice print update and a visual but not audio feedback to the user. The system is not directed toward the operation of a computer.

U.S. Pat. No. 5,086,385 to Reuel O. Launey et al discloses a system for, and a method of, providing an expandable home automation controller which supports numbers and different types of data communications with appliances and subsystems within the home as well as systems external to the home. Audio/visual feedback is provided to the user, as is switchable input/output to house control modules such as lighting control. The system is not directed toward computer operation.

U.S. Pat. Nos. 4,471,683, 4,725,956, 5,046,099 are directed toward a voice controlled weapons launch system, voice control of a remotely piloted vehicle, and a speech recognition system wherein prior parameters of acoustic prototype vectors are adapted to a new speaker to obtain posterior parameters by having the speaker utter a set of adaptation words, respectively.

SUMMARY OF THE INVENTION

The present disclosure sets forth a voice controlled, user focused interface for a computer and preferably for a personal computer. In particular, it sets forth an interface system which provides icons in the same fashion as the GUI on the desktop, yet it has the enhanced feature that takes out a tremendous amount of uncertainty for unskilled or semi-skilled operators of personal computers. Rather than stroke a selected function key or alternately click on an icon to initiate a specific task, the user speaks an appropriate word or words to initiate and perform the desired task. Furthermore, the system verifies all spoken words so that the user knows without doubt that the word spoken corresponds to the task or action that is desired. When a spoken word is received or "heard" by the system, a voice controlled GUI is initiated in operation so that the spoken word is tested against a limited set of words or "vocabulary" in inventory within the system. If the spoken word is matched with one of the vocabulary words, the user is notified of the "recognition" of the word by audio or visual indication, or possibly both. As an example, if the user speaks a specific task to be performed, an icon in the GUI which represents that task may flash on the screen indicating that the spoken call for a subroutine to perform that task has been recognized by the system. Simultaneously, a tone may sound or a "spoken" verification may be issued by the system. If no recognition is indicated, then either (a) the spoken word is not recognized due to poor pronunciation of the word by the user, or (b) the spoken word is not in the system vocabulary. The system prompts the reader to again utter the word as an attempt to rectify mispronunciation. If the system again fails to recognize the word, the user is notified by the system that specific word or command is not in the vocabulary.

Upon recognition of a word, the system proceeds in performing a corresponding action or task. The recognized word is input into a sequence of computer instructions to perform the action of one or more tasks. Again, if the spoken word is a command to perform a specific task such as send a fax, the subroutine or subroutines required by the computer are automatically fetched by the system. The sequence of computer instructions is thereby configured to perform the defined task. The desired task is called or initiated by voice command only. No key strokes or cursor movements or mouse clicks are required. In other words, the intimidation factor is markedly reduced because the beginning user is then shown, on the monitor screen, which subroutine has been chosen or which task has been performed as a result of a spoken word or phrase. The action or called subroutine is clearly indicated and labeled on the monitor screen thereby giving the user the confidence that the proper and correct subroutine or task command has been chosen. As used hereinbelow, the term subroutine refers to a sequence of steps or instructions which are executed to accomplish a specific task.

Returning for a moment to use of prior art computer interface systems, the initial screen which is shown is normally a rather static or fixed graphic display. It is typically informative but it is informative only at a high level of competency. To a beginner, it can be very intimidating. The present invention begins with a new initial or start up screen altogether. As will be described in some detail below, the screen, at the start, enables the user to speak to the computer and have the computer return to the user an audio or a visual or and audio visual response. In effect, the initial and the first several screens thereafter act interactively a simulated personal attendant or "helper" to the unskilled user. Instead of communicating back and forth with the inanimate PC by means of a key board, a mouse, and a monitor screen, the disclosed system interacts with the beginning user as though it were a personal assistant or helper who is at the same level of communication skills as the user.

The set up interaction provided by the disclosed interface might be analogous to the initial interaction between an individual and a friendly butler. Upon meeting, the butler immediately speaks and says something in the way of greetings and solicitation to the individual. Likewise, the disclosed system greets beginning user at the start of the work session with the computer. Subsequently, the butler may say "may I help you?" By means of dialog back and forth between the individual and the butler, plans are made to accomplish specific tasks. Likewise, the user and the disclosed systems lay the groundwork for subsequent tasks by means of dialog prompted by initial screens. Even though briefly proceeding only through five or six screens with appropriate words back and forth, interactive system builds a sense of connection so that the user is then able to quickly get into the task that the user wishes to perform.

The above discussion has been directed toward the initiation or a start up of a work session with the computer. Attention is now directed to the performance of a specific task or the performance of specific tasks. At this point, the system has directed the computer to fetch the appropriate subroutine or subroutine as discussed previously. The system then prompts the user for the next command. Once prompted, the user speaks the appropriate word or phrase to execute the next sequential command in the subroutine. As in the initialization of the work session, each spoken command is compared with the system vocabulary, and recognition of the spoken command by the system is again indicated by preferably and audio and a video signal. Each recognized command is converted into a computer compatible instruction or "machine language" instruction and input into the central processing unit (CPU) of the computer for execution of the subroutine. The prompt, spoken word, word recognition, subroutine step execution cycle is repeated as the computer performs the user chosen task under the control of the appropriate subroutine. When the task is finished, the user is so notified by audio or visual prompt by the system. The user can also end the task as will be detailed in a subsequent section. If appropriate, the CPU outputs the results of the subroutine to an output device, such as a printer, facsimile machine, plotter, digital storage means and the like.

For purposes of briefly illustrating the voice control computer interaction system, the following example is presented. It should be understood that interaction between user and computer can take many forms, and the dialogue discussed below is representative of only one embodiment of the invention. Assume that the inexperienced user wishes to compose a memorandum or "memo", transmit the memo via fax, and file a copy of the transmitted fax. When the computer is turned on, the helper appears on the monitor screen preferably as a human image, and briefs the user on the general operation of the voice control interface system. The GUI icons representing various task modules or task subroutines are displayed on the desk top as described previously. These icons include representations of the tasks "create a memo" and "fax". Since the first task at hand is to create a memo, the user speaks, as an example, "create a memo". Upon recognition of this phrase by the system, the "create a memo" icon flashes notifying the user that this phrase has been recognized. Notification can alternately be by audio tone or even a synthesized voice acknowledgment. Under the control of the fetched "create a memo" subroutine, a window appears on the screen which displays a cursor. All module icons still remain clearly visible around the margin of the window. The user is then prompted, either visually or by synthesized voice, to start composing the text of the memo, and that the text will begin at the cursor position. Text can be input verbally, with each word appearing in the window in the form of written text as it is recognized by the system. Since the system is designed to contain a rather limited vocabulary, an alternate method of inputting text for a memo or letter is by means of a conventional computer keyboard. The system also informs the user how to "end" the memo. Upon completion of the memo, the user terminates the "create a memo" task as prompted by the system. This can be done by the simple utterance of the phrase "end memo" or, alternately, by function keys on the keyboard. The memo being completed, the user next speaks the word "fax". The fax icon preferably flashes indicating that the command word has been recognized by the system. The "fax" subroutine is fetched and the user is queried, either verbally or visually, to ascertain the fax recipient, the fax number, and any other pertinent information. Once the user provides this information verbally or by keyboard input, the subroutine transfers the composed memo through an interface unit to and external fax machine for transmission in a conventional manner. Furthermore, the user is queried by the fax subroutine concerning the filing of the transmitted fax, namely, if the fax to be filed and if so, the identity of the storage medium. The multiple tasks of creating a memo, sending this memo as a fax, and filing the fax is accomplished by the inexperienced computer user with minimal interaction with the computer other than verbal commands. The system prompts the user through every step. The initial screen is relatively uncluttered and unintimidating.

The foregoing sets forth some of the problems to be confronted in the use of the present invention and also provides an example of task executions for the less than skilled computer user. It provides something of a brief summary focusing on the particular example given. In addition to that, the foregoing sets out a sense of mastery of the user over the otherwise intimidating set of icons and instructions visible at the GUI.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
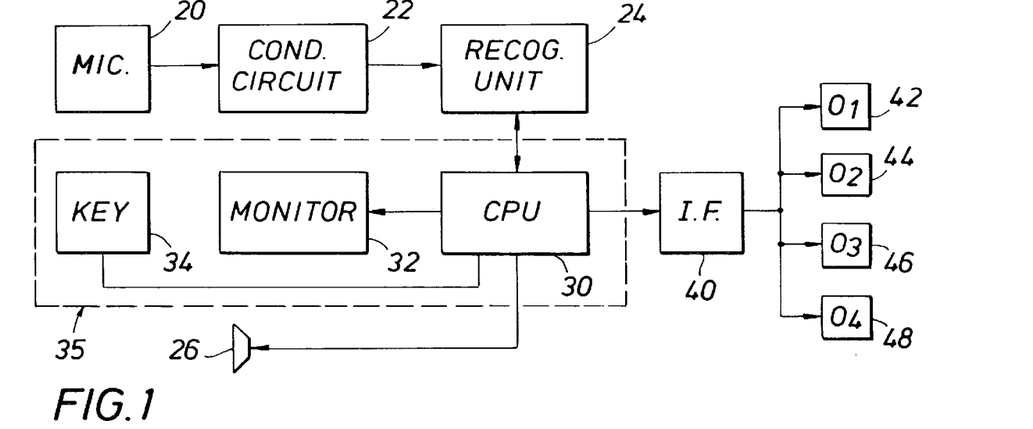
FIG. 1 is a functional diagram of the elements of the voice control computer interface system cooperating with a computer system and a plurality of output devices.

Attention is first directed to FIG. 1 which shows a functional diagram of the voice control computer interface system cooperating with a computer and a plurality of computer output devices. A user communicates with the system preferably by speaking word or phrase instructions, commands, and query answers into a microphone 20. The microphone 20 is electrically connected to a conditioning circuit 22 which converts the acoustic word or words into preferably a digital representation of the spoken word or words. The conditioning circuit 22 also contains suitable amplification means to electrically amplify the digitized words, if necessary. It should be understood that the conditioning circuit 22 can be of the type to convert spoke words into analog rather than digital electrical representation, but digital conversion is preferred. The digitized words are next transferred to a recognition unit 24 which attempts to match the digitized spoken words with words contained in a stored vocabulary of words. The matching process is well known in the art. The stored vocabulary can reside in a host CPU 30, or can be stored in a separate data base memory within the recognition unit 24, or can be stored in a central data base shared by other systems and other users. A specific action or task instruction is stored with each vocabulary word. When a match or "recognition" between a spoken word and a vocabulary word is found, then the CPU 30 is instructed, preferably by means of a computer compatible instruction transferred from the recognition unit 24, to perform an action or task associated with the recognized word. This process is the basic means by which the user verbally instructs the computer to perform specific tasks or answers specific queries from the computer interface system.

Still referring to FIG. 1, the CPU 30, a monitor 32, and preferably a keyboard 34 represent the major elements of a "computer" identified as a whole by the numeral 35. As mentioned previously, the computer 35 is preferably a personal computer (PC), but can alternately be any type of programmable computer. Two way communication exists between the CPU 30 and the recognition unit 24 so that the word vocabulary can be stored within a data base residing in the CPU. The CPU 30 outputs information to an interface circuit 40 which, in turns, interfaces with a plurality of output devices. Four such output devices "$O_i$" (i=1, . . . ,4) are shown and identified with the numerals 42, 44, 46, and 48. These output devices might be printers, fax machines, plotters, mass data storage devices, and the like. As mentioned in previous discussion, the preferred method of data input or query response is by means of speaking into the microphone 20. Alternately, response can be entered manually by means of the keyboard 34. Also as discussed previously, the system can query the user or verify commands and answers by the user by either audio or visual means. The audio system responds is either a tone or a synthesized or recorded voice response emitted through a speaker 26 which is electrically connected to the CPU 30. The visual system response is either by text or flashing or highlighted icons displayed on the screen of the monitor 32.

Figure 2:
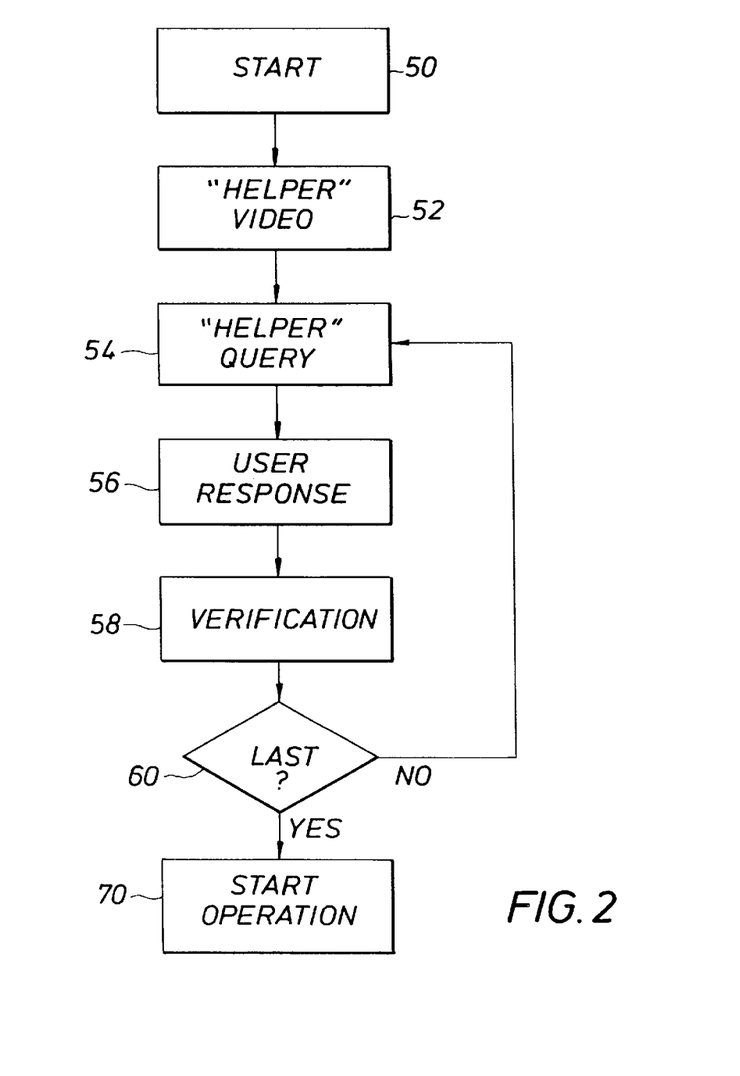
FIG. 2 is a flow diagram of the start up sequence of the voice control computer interface system.

Attention is directed to FIG. 2 which illustrates a simplified flow chart of the session start up sequence of computer instructions. More specifically, FIG. 2 illustrates the steps that the inexperienced user and the system take from the time the computer is switched on until the time that the user starts to perform specific tasks with the computer. The initiation of the session is identified by a step 50. At step 52, the user is presented with a video, with accompanying audio, that introduces the voice control interface system. The video is displayed on the screen of the monitor 32. Preferably, multiple videos narrated by a female, a male, and even an animated character are stored within the CPU 30 so that the user can select the narrator or "helper" that provides the greatest comfort level. At step 54, the helper queries the user to set up the interface system to match the needs of the user. Specific questions would include the name of the user, the name which the user would like to use in addressing the helper, the type of background that the user prefers for the screen of the monitor 32, the type of task module icons that the user would like displayed on the desk top, and the like. The user responds preferably verbally at step 56. Recognition of the user response is verified to the user at step 58. As discussed previously, this verification can be a visual signal on the monitor 3 2 or an audio signal, either tone or synthesized "word", over the speaker 26. Through a series of questions (or "queries") and answers, the user and the sequence of start up instructions configure the system to the users needs. At step 60, each response is checked to determine if it is the last response. If the response is not the last "start up" response, control is returned to the step 54 for the next start up query. If the response is the last start up sequence response, control is transferred to initiate a "task" sequence of computer instructions, for the task oriented portion of the session, at step 70. The last query response can be identified in several ways. The preferred method is "automatic" in that the system recognizes that it has issued the last start up query and that the following answer must, by definition, be the "last" response. Alternately, the user can terminate the start up sequence by speaking a key word or phrase which is preferably "end start up".

Before leaving the session start up sequence, the types of subroutine modules stored within the CPU 30 should be addressed. Recall that these task oriented subroutines are represented by icons which appear on the desk top of the monitor screen. During the start up session, the user specifies, preferably verbally, only the icon to be displayed based upon the tasks to be performed. This feature of the invention greatly reduces screen clutter and correspondingly reduces the anxiety level of the inexperienced computer user. Typically, the following subroutines to perform the following tasks will be stored in the data base preferably residing in the CPU 30:

TABLE 1

| Write a fax | Send a fax |
|---|---|
| Create a memo | Create an expense report |
| Calculator | Schedule an appointment |
| Send an Email | Draw a picture |
| Create a presentation | Browse the Internet |
| Contact Manager | Set a reminder |
| Create a data base | Reconcile bank account |
| Write a letter | Schedule a meeting |

It should be understood that the above tabulation is only representative, and that additional subroutine modules can be added or deleted from the data base.

Figure 3:
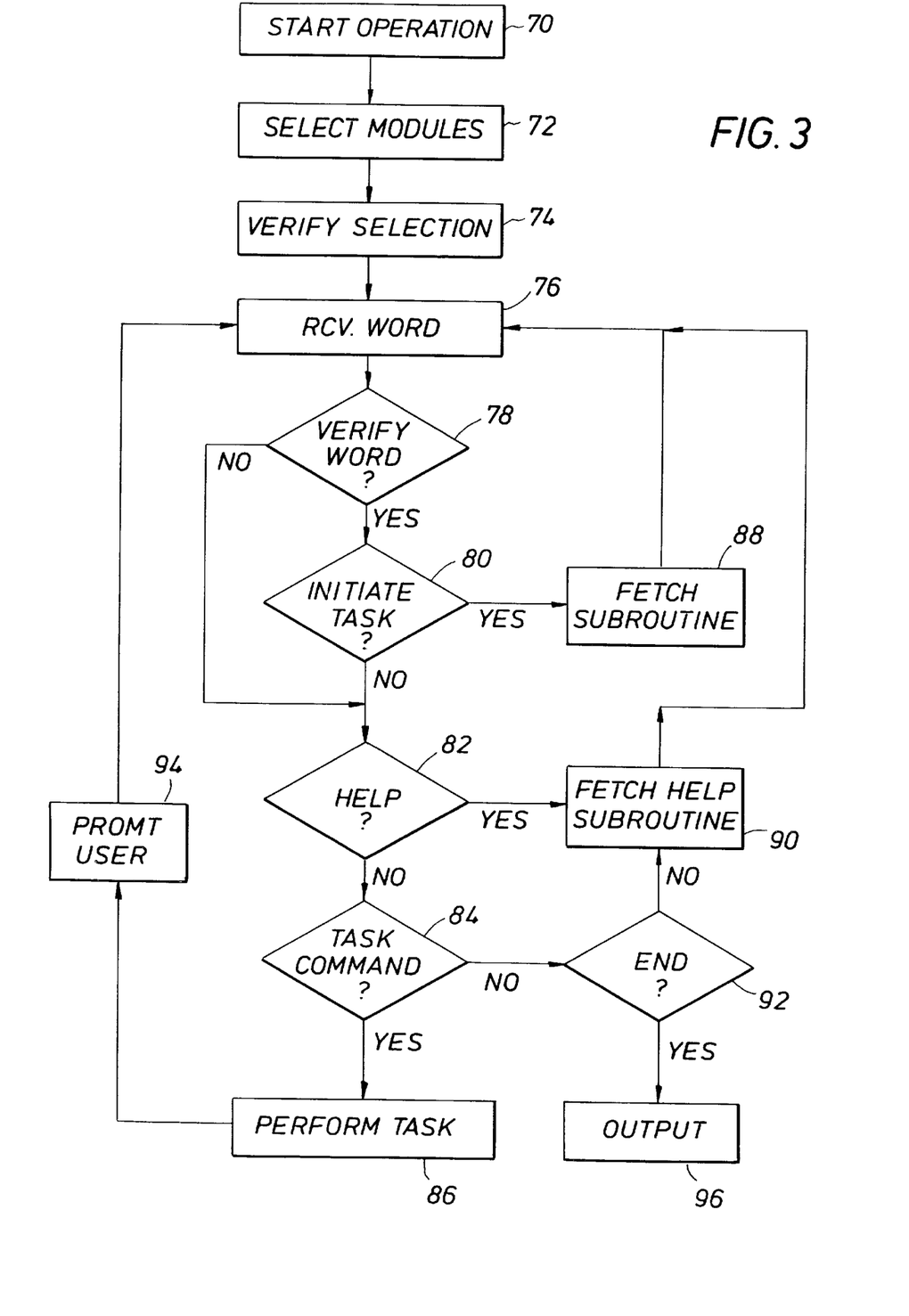
FIG. 3 is a flow diagram of the operating sequence of the voice control computer interface system.

The actual performance of a desired task is illustrated in the flow chart of FIG. 3. This operational or task sequence of computer instructions phase is initiated at step 70. At step 72, the user selects a specific task to be performed from the group of task icons selected during the start up phase. The selection is preferably verbal. as an example, if the user selected the tasks "create a memo", "send a fax", "calculator", and "create a presentation" at start up, these icons will appear in the GUI on the users desk top. If the user speaks "create a memo", this will initiate the fetching of the subroutine needed to create a memo from the data base. At step 74, the user is notified that the spoken command has been recognized by the recognition unit 24 cooperating with the CPU 30. Recognition verification can be visual, such as a flashing "create a memo" icon in the example. Likewise, recognition verification can be audio such as a tone emitted from the speaker 26 or a repeat of the word synthesized by the CPU 30 and "broadcast" through the speaker 26. Both audio and visual recognition verification can be used simultaneously. At step 78, the system checks to see if the operation associated with the spoken word or phrase is designed to initiate a specific task. If the answer to this internal query is "yes", the appropriate subroutine to perform the task is fetched from the system data base. The answer "no" indicates that the appropriate subroutine has already been fetched and the actual execution of the task is underway.

The user can, at any time during the execution of a task, ask the system for "help" should it be needed. The request is preferably verbal and is obtained by simply speaking the word "help" into the microphone 20. Referring again to FIG. 3, the spoken word is checked at step 82 to determine if it is a help request. If the word is a help request, a help subroutine is fetched at step 90. The help subroutine, which is not illustrated in a flow chart, utilizes a "pointer" such that the system knows, at all time, what specific instruction of the task sequence of computer instructions is being executed. If the user requests help at any given point of the execution, the help subroutine can address problems associated with that particular step in the subroutine. The system, either verbally or through text, prompts the user through the difficulty.

If the query at step 82 determines that the recognized word is not a request for help, then the recognized word is examined at step 84 to determine if it is a command word required to perform the selected task. If the word is a command word, the specific task instruction associated with the word is performed at step 86, the user is prompted preferably verbally by the system for the next needed information at step 94, and control of the system is returned to step 76 where the next spoken word is received.

If the query at step 84 determines that the recognized word is not a task command, the word is examined at step 92 to determine if it is an "end task" command. If it is not an end task command, and it has been determined in previous step that it is not an initiate task, help, or task command, then an error exists in that the word has been recognized but can not be properly categorized. Control is transferred to fetch the help subroutine at step 90, and the help subroutine queries the user to determine the proper classification of the word. If, however, the query at step 92 determines that the word is an end task command, this indicates that the selected task has been successfully completed, and the task results are output to the appropriate external output device at step 96. Using the "create a memo" task as an example, the created memo is preferably read back by the audio function of the system to the user for approval, and then recorded on an external device such as a printer, or transferred to an external device such as a fax machine for transmission, or filed in an external device such as a disk storage device.

Figure 4:
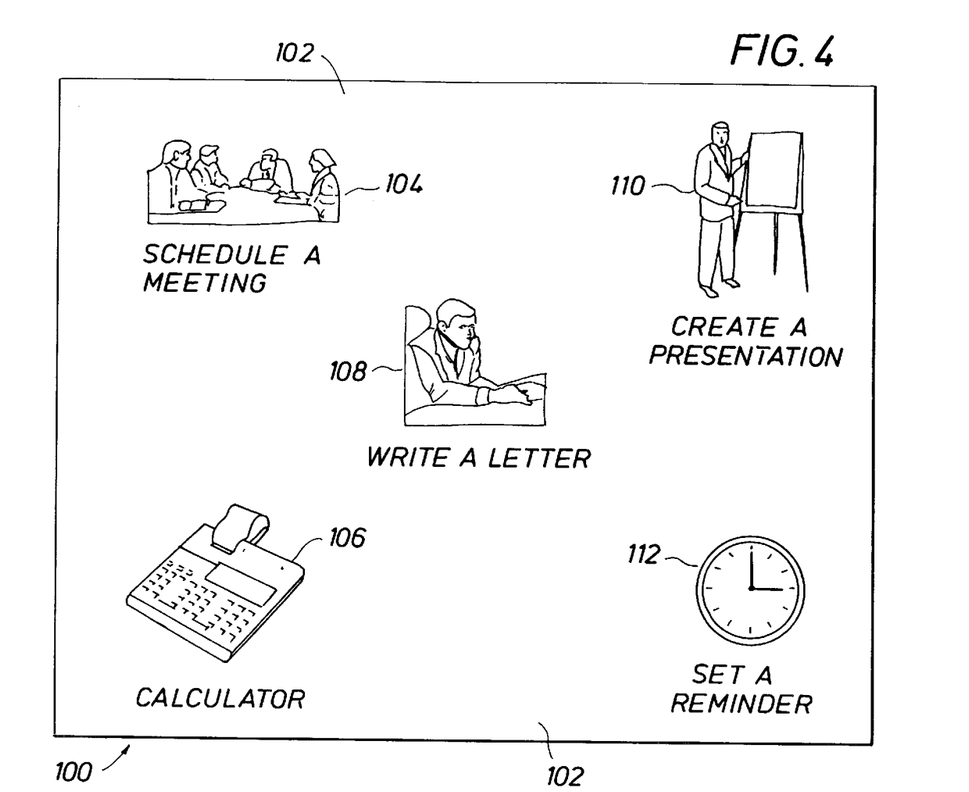
FIG. 4 is an illustration of a monitor screen displaying selected task icons provided by the interface system.

FIG. 4 illustrates a typical selected initial GUI screen identified by the numeral 100. The screen is configured by the user, to the user's specific needs, during the set-up sequence discussed previously and illustrated in flow chart form in FIG. 2. The GUI background has been selected by the user to be a marble pattern as denoted by the numeral 102. FIG. 4 shows that the user has selected five subroutine modules from Table 1, which is a tabulation of typical data base subroutines, during the start up sequence. These selected subroutine modules are "schedule a meeting" represented by an icon 104, "calculator" represented by an icon 106, "write a letter" represented by an icon 108, "create a presentation" represented by an icon 110, and "set a reminder" represented by an icon 112. It should be noted that subroutine modules can be added to the data base as they are developed or as they become available commercially. Corresponding words must also be added to the system vocabulary so that the added subroutine modules can be fetched as previously described. Furthermore, the data base in which the subroutines are stored can reside within the CPU 30, or resided within a shared, common data base (not shown) which can be readily accessed by the CPU 30.

If a task is selected which requires a window on the monitor screen, the icons in the GUI are positioned around the margin of the window so that they are still clearly visible at all times by the user. Task requiring such a window would include "create a memo", "write a letter", "prepare a memo", and the like.

Figure 5:
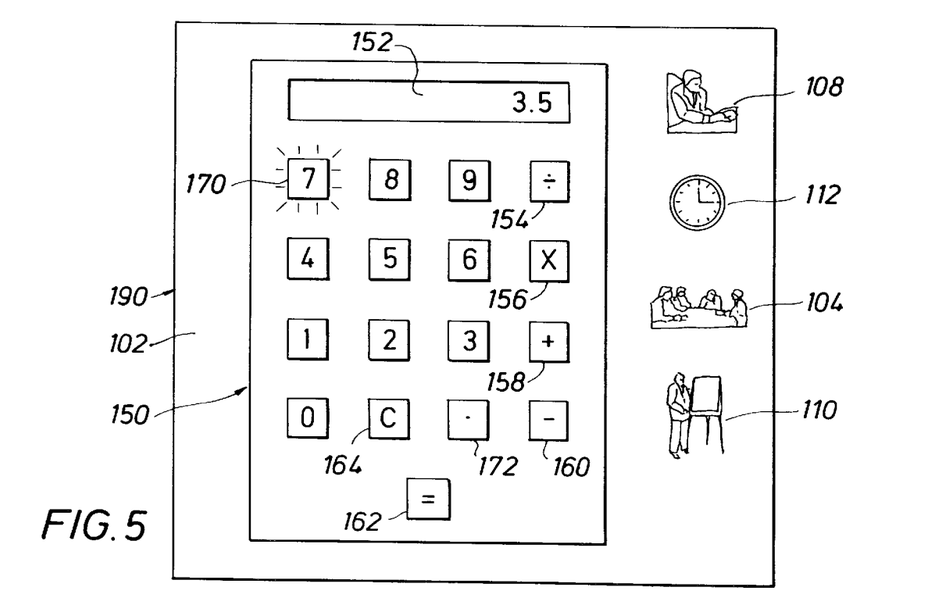
FIG. 5 depicts the screen for a "calculator" task subroutine.

A feel for the size of the vocabulary needed to communicate with available task subroutine modules can best be obtained by the use of an example. The "calculator" task will be used as a specific example. FIG. 5 illustrates a screen 190 displaying the "calculator" task which has been verbally specified. The background pattern 102 has been selected to be marble as in FIG. 4. Other selected icons 104, 108, 110 and 112 are automatically arranged in the margin by the system such that they are clearly visible at all times by the user. For purposes of illustration, a simple "four function" calculator is used and is identified with the numeral 150. The divide, multiply, add and subtract "keys" are identified by the numerals 154, 156, 158 and 160, respectively. The "clear" key is identified with the numeral 164 and the execute or "equal" key is identified with the numeral 162. Consider now the vocabulary that is necessary for the operation of the calculator subroutine. Numbers are required to be dictated by the user to the calculator subroutine. Therefore, the numbers "zero" through "nine" are stored as a total of ten vocabulary words. The "multiply", "divide", "add" and "subtract" functions require an additional four vocabulary words. The "equal" and "clear" functions and the decimal key 172 require an additional three vocabulary words. The total vocabulary for the calculator subroutine is, therefore, only seventeen words for the simple calculator illustrated in FIG. 5. For a more complex calculator which perform additional functions such as square root, factorial, etc., additional vocabulary would be required to command these functions. If the calculator subroutine is used to perform the simple multiplication of 7×0.5, the user would first speak "seven". Upon verification of the word "seven", the "7" on the calculator would flash, as illustrated by the numeral 170, indicating verification. Simultaneously, the system could verbally repeat the word "seven" indicating verification. Sequentially, the user would then speak "times", "point", "five", and "equals". After each word is spoken, the aforementioned visual and audio means of verification would indicate that the word is recognized. The answer appears in the calculator graphics field 152 and is alternately "spoken" as "three point five" by the system. If a digit or function is erroneously spoken by the user, the user simply speaks the word "error" which negates the previously spoken word. This feature, of course, requires another word be stored in the subroutine vocabulary, namely "error".

The system allows more than one task subroutine to be interchangeably accessed during a user session. Recall that icons representing all selected task subroutine modules are available to the user, as illustrated in FIG. 5, at all times on the GUI. Assume, as an example, a user is using the "Reconcile bank account" subroutine to trace a perceived error in a checking account. Assume further that the user needs momentary access to a calculator in tracing the perceived error. The user simply speaks "calculator", and the system recognizes that a new "initiate task" word has been spoken prior to ending a previous task. The previous task (in this example "Reconcile bank account") is held in suspension until the presently call for subroutine task (in this example "calculator") is terminated. The user speaks the phrase "end task" when finished using the calculator, and control of the system returns to the "Reconcile bank account" task subroutine.

In summary, the voice control computer interface allows users to create a tool that meets their individual needs. More importantly the system can be used to meet the requirements for personalized ease of use and utility for an inexperienced computer user. The simplified voice activated tools and options provided by the system meets the needs of the majority of computer users. While specific tools are supplied, the users are allowed to choose how these tools look and how these tools react on their computers. The users chooses the GUI backgrounds with which they feel comfortable. The users choose the icons representing the available tasks that they wish to accomplish. Icons and other graphics are placed on the monitor screen in any size they choose and in any location that they wish. Once these graphics are on the screen, the user is given preferably verbal tutorials on how to accomplish the tasks represented by the graphics. The user interface is comfortable, personal and intuitive. Help is always available for the asking. Additional task subroutine modules can be added to the data base as they become available. The system can operate with an individual data base, or from a common, shared data base which is accessed by the user's computer. The invention is used to make the computer a familiar and comfortable tool, especially for the unskilled computer user.

While the foregoing is directed to the preferred embodiment of the present invention, other and further embodiments of the invention may be devised without departing from the basic scope thereof, and the scope thereof is determined by the claims which follow.

What is claimed is:

1. A voice controlled computer interface system comprising:

(a) a sequence of computer instructions requiring input by a user in order to perform one or more tasks;

(b) a microphone into which said user utters said sequence;

(c) a help subroutine included within said computer instructions which, upon activation by utterances from said user, aids said user in providing said input;

(d) a conditioning circuit for forming a conditioned input signal from said utterances;

(e) a stored vocabulary; and (f) a recognition unit for correlating said conditioned input signal with an element of said stored vocabulary thereby creating compatible instructions recognizable by said computer.

2. The system of claim 1 further comprising a speaker which cooperates with said computer, wherein said speaker emits an audio indication of the result of said correlation of said conditioned input signal and an element of said stored vocabulary.

3. The system of claim 1 wherein:

(a) said sequence of computer instructions is utilized by said computer to perform a task, wherein said task is defined by said correlation of said conditioned input signal with said element of said stored vocabulary; and (b) the result of said performed task is output to one or more output devices.

4. The system of claim 3 wherein said sequence of computer instructions prompts said user to utter commands required to perform said tasks.

5. A voice controlled system for operating a computer, the system comprising:

(a) a start up sequence of computer instructions which assists, by means of answers to queries, a user in providing a start up instruction to initiate said computer;

(b) a task sequence of computer instructions with which said user provides, by means of a task command, a task instruction to said computer to perform a task;

(c) a help subroutine contain within said task sequence of computer instructions which determines which instruction in said task sequence of computer instructions is being performed and which aids said user in providing said task command;

(d) a microphone into which said user utters said task command or answers to said queries;

(e) a conditioning circuit for forming a conditioned input signal from said utterances;

(f) a stored vocabulary; and (g) a recognition unit for correlating said conditioned input signal with an element of said stored vocabulary thereby defining said start up instruction and said task instruction, and for transmitting said instructions to said computer.

6. The system of claim 5 further comprising a speaker with which said an audible signal is emitted indicative of the result of said correlation.

7. The system of claim 5 wherein said start up sequence of computer instructions is used to query said user by means of said speaker.

8. The system of claim 5 wherein said task sequence of computer instructions further comprises:

(a) a plurality of task subroutines;

(b) a task selection step in which said user utters into said microphone the desired task to be performed;

(c) a verification step at which said uttered task is verified with tasks stored within said vocabulary thereby creating a verified task command;

(d) an initiation step in which said verified command step is used to fetch and initiate a desired task subroutine to perform said desired task; and (e) a plurality of steps used to prompt the user for specific commands required to execute said desired task subroutine.

9. The system of claim 8 wherein said user is prompted by means of audible queries emitted from said speaker.

10. The system of claim 8 wherein said user is prompted by means of a visual monitor.

11. A voice controlled computer system comprising:

(a) a computer;

(b) a sequence of computer instructions with which a user provides an operational instruction to said computer by means of an input, wherein said computer instructions include a help instruction which aids said user in providing said operational instructions;

(c) a microphone into which said user utters said input;

(d) a conditioning circuit for forming a conditioned input signal from said utterances into said microphone;

(e) a stored vocabulary; and (f) a recognition unit for correlating said conditioned input signal with an element of said stored vocabulary thereby creating said operational instruction in a form recognizable by said computer.

12. The system of claim 11 further comprising an interface circuit which cooperates with said computer and which cooperates with at least one output devices thereby permitting the result of a task performed by said computer to be output by said at least one output device.

13. The system of claim 12 wherein said computer comprises;

(a) a central processor unit; and (b) a monitor which cooperates with said central processor unit, wherein said monitor displays an indication of the result of said correlation of said conditioned input signal and an element of said stored vocabulary.

14. The system of claim 13 further comprising a speaker which cooperates with said computer, wherein said speaker emits an audio indication of the result of said correlation of said conditioned input signal and an element of said stored vocabulary.

15. The system of claim 12 wherein:

(a) said computer performs a task which is defined by said correlation of a first conditioned input signal with an element of said stored vocabulary; and (b) the result of said performed task is output to said at least one output device.

16. A method for controlling the operation of a computer by means of voice statements comprising:

(a) providing a sequence of computer instructions which require additional input from a user in order for said computer to perform one or more tasks;

(b) speaking by said user into a microphone said input required by said sequence of computer instructions;

(c) optionally requesting aid, from said sequence of computer instructions, in determining said input required by said sequence of computer instructions;

(d) providing a stored vocabulary; and (e) correlating said input with an element of said stored vocabulary thereby creating a specific instruction recognizable by said computer.

17. The method of claim 16 further comprising providing said user, by means of said sequence of computer instructions, the results of said correlation of said input and said element of stored vocabulary.

18. The method of claim 16 further comprising:

(a) performing a task by means of said sequence of computer instructions, wherein said task is defined by said correlation of said input with said element of said vocabulary; and (b) outputting the results of said performed task by means of one or more output devices.

19. The method of claim 18 wherein said sequence of computer instructions prompts said user to utter commands required to perform said task.

20. A voice controlled method for operating a computer, the method comprising:

(a) providing a sequence of computer instructions which assists, by means of answers to queries, a user in providing a start up instruction required to initiate said computer;

(b) providing a sequence of computer instructions with which said user provides, by means of a command, a task instruction to said computer to perform a task;

(c) uttering said answers to said queries and said commands into a microphone which cooperates with said computer;

(d) optionally uttering a request for help in answering said queries and receiving help from said sequence of computer instructions;

(e) conditioning said utterances thereby forming a conditioned input signals;

(f) providing a stored vocabulary;

(g) correlating each said conditioned input signal with an element of said stored vocabulary thereby defining said start up instruction or said task instruction, and (h) transmitting said start up instruction or said task instruction to said computer.

21. The method of claim 20 further comprising:

(a) audibly querying said user by means of a speaker which cooperates with said computer; and (b) notifying said user of the results of said correlation by means of said speaker.

22. The method of claim 20 wherein said provided sequence of computer instructions with which said user provides a task instruction comprises:
   (a) a plurality of task subroutines;
   (b) a task selection step in which said user utters into said microphone the desired task to be performed;
   (c) a verification step at which said uttered task is verified with tasks stored within said vocabulary thereby creating a verified task command;
   (d) an initiation step in which said verified command step is used to fetch and initiate a desired task subroutine to perform said desired task; and
   (e) a plurality of steps used to prompt the user for specific commands required to execute said desired task subroutine.

23. The method of claim 22 wherein said user is prompted by means of a speaker which cooperates with said computer.

24. The method of claim 22 wherein said user is prompted by means of a visual monitor which cooperates with said computer.

25. A voice controlled computer system comprising:
   (a) a computer;
   (b) a sequence of computer instructions with which a user provides an operational instruction to said computer by means of an input;
   (c) a microphone into which said user utters said input;
   (d) a conditioning circuit for forming a conditioned input signal from said utterances into said microphone;
   (e) a stored vocabulary;
   (f) a recognition unit for correlating said conditioned input signal with an element of said stored vocabulary thereby creating said operational instruction in a form recognizable by said computer; and
   (g) an interface circuit which cooperates with said computer and which cooperates with at least one output devices thereby permitting the result of a cask performed by said computer to be output by said at least one output device, wherein
      (i) said computer performs a task which is defined by said correlation of a first conditioned input signal with an element of said stored vocabulary,
      (ii) the result of said performed task is output to said at least one output device,
      (iii) said at least one output device to which said performed task is output is specified by a second conditioned input signal; and
      (iv) wherein said computer prompts as a help instruction said user to utter commands required to perform said task.

* * * * *